(12) United States Patent
Fujii

(10) Patent No.: US 12,104,630 B2
(45) Date of Patent: Oct. 1, 2024

(54) ASSEMBLY STRUCTURE

(71) Applicant: DENSO TEN Limited, Kobe (JP)

(72) Inventor: Hideyuki Fujii, Kobe (JP)

(73) Assignee: DENSO TEN Limited, Kobe (JP)

( * ) Notice: Subject to any disclaimer, the term of this patent is extended or adjusted under 35 U.S.C. 154(b) by 430 days.

(21) Appl. No.: 17/520,094

(22) Filed: Nov. 5, 2021

(65) Prior Publication Data

US 2022/0307528 A1  Sep. 29, 2022

(30) Foreign Application Priority Data

Mar. 25, 2021 (JP) ................................ 2021-050930

(51) Int. Cl.
*F16B 2/06* (2006.01)
*F16B 5/06* (2006.01)
*B60K 35/00* (2024.01)

(52) U.S. Cl.
CPC .............. *F16B 2/06* (2013.01); *F16B 5/0664* (2013.01); *B60K 35/00* (2013.01); *F16B 2200/20* (2018.08)

(58) Field of Classification Search
CPC ...... F16B 2/02; F16B 2/04; F16B 2/06; F16B 5/0621; F16B 5/0664; F16B 2200/20; F16B 2200/205; Y10T 403/1616; Y10T 403/1624; Y10T 403/59; Y10T 403/591; Y10T 403/60; Y10T 403/66; Y10T 403/7075; Y10T 292/0894; Y10T 292/0895; Y10T 292/0908; G06F 1/16; H05K 5/00; Y10S 292/53; B60K 35/00; H02G 3/08; H02G 3/081; H02G 3/086; H02G 3/14

USPC ........... 403/380; 439/527, 571; 220/3.7, 3.8, 220/3.94, 4.02
See application file for complete search history.

(56) References Cited

U.S. PATENT DOCUMENTS

| | | | | |
|---|---|---|---|---|
| 5,551,589 A | * | 9/1996 | Nakamura | ............ E05C 19/066 220/326 |
| 5,743,606 A | * | 4/1998 | Scholder | ................. F16B 12/26 361/725 |
| 5,788,522 A | * | 8/1998 | Kameyama | .......... H01R 13/627 439/248 |
| 5,931,514 A | * | 8/1999 | Chung | .................... F16B 12/26 292/87 |
| 7,733,659 B2 | | 6/2010 | Snider et al. | |

(Continued)

FOREIGN PATENT DOCUMENTS

JP   S60-020175 U   2/1985
JP   2014-139077 A  7/2014

*Primary Examiner* — Amber R Anderson
*Assistant Examiner* — Kevin J Baynes
(74) *Attorney, Agent, or Firm* — Oliff PLC

(57) ABSTRACT

An assembly structure for assembling a first part to a second part includes a first assembly portion provided in the first part and a second assembly portion provided in the second part. The first assembly portion includes a base, an engagement portion that elastically-deformable and protrudes from the base, and a hole formed in a circumference of a connection portion at which the engagement portion is connected to the base. The second assembly portion includes a locking portion that is engaged with the engagement portion to lock the first and second assembly portions together, and a projection that is inserted into the hole. In a state in which the projection is inserted into the hole, the engagement portion is engaged with the locking portion.

4 Claims, 14 Drawing Sheets

(56) References Cited

U.S. PATENT DOCUMENTS

| | | | | |
|---|---|---|---|---|
| 8,648,264 B2* | 2/2014 | Masumoto | ............... | H02G 3/14 |
| | | | | 220/281 |
| 10,111,350 B2* | 10/2018 | Morihara | ............. | H05K 7/1427 |
| 10,608,422 B2* | 3/2020 | Kawamura | ............. | H05K 5/02 |
| 10,806,039 B2* | 10/2020 | Maurech | ............. | H05K 5/0221 |
| 10,917,977 B2* | 2/2021 | Miklosi | ................ | H05K 5/0221 |
| 2011/0017742 A1* | 1/2011 | Sausen | ............... | B60H 1/00528 |
| | | | | 403/345 |
| 2014/0016996 A1* | 1/2014 | Chung | ................. | H05K 5/0013 |
| | | | | 403/321 |
| 2017/0201079 A1* | 7/2017 | Shiraki | ............... | B60R 16/0238 |

* cited by examiner

ASSEMBLY STRUCTURE

BACKGROUND OF THE INVENTION

Field of the Invention

The invention relates to an assembly structure for assembling a first part to a second part.

Description of the Background Art

An electronic equipment such as a car navigation equipment, a car audio, or the like, is configured in which a resin panel that is provided with a display and an operation portion is assembled to a body that stores an electronic component such as a drive circuit, a display panel, or the like, in an interior of a housing. In relation to this, a structure for assembling the resin panel to the body by using a snap-fit engagement portion (i.e., fitting and fixing the resin panel to the body using elastic properties of a material) has been known (for example, refer to Japanese Published Unexamined Patent Application No. 2014-139077).

Examples of the assembly structures using the snap-fit engagement portion include a structure for fixing two parts by the engagement portion, a structure for fixing two parts using a fastening member, such as screw, after temporarily fixing the two parts by the engagement portion, and the like. Since the engagement portion is used for fixing two parts, in order to accurately assemble the two parts, a positioning portion is also required. Conventionally, as the structure for assembling the resin panel to the body using a snap-fit engagement portion of the resin panel, there is a technology that performs positioning between the two parts by inserting a pin of the resin panel provided separately from the engagement portion into the body.

In the conventional technology, the engagement portion for fixing and the positioning portion for positioning have been provided in separate places. Therefore, a large space has been required for providing the engagement portion and the positioning portion.

SUMMARY OF THE INVENTION

According to one aspect of the invention, an assembly structure for assembling a first part to a second part includes a first assembly portion provided in the first part and a second assembly portion provided in the second part. The first assembly portion includes a base, an engagement portion that is elastically-deformable and protrudes from the base, and a hole formed in a circumference of a connection portion at which the engagement portion is connected to the base. The second assembly portion includes a locking portion that is engaged with the engagement portion to lock the first and second assembly portions together, and a projection that is inserted into the hole. In a state in which the projection is inserted into the hole, the engagement portion is engaged with the locking portion.

It is an object of the invention to provide a technology capable of reducing a space required for positioning and fixing two parts in an assembly structure for assembling a first part to a second part.

These and other objects, features, aspects and advantages of the invention will become more apparent from the following detailed description of the invention when taken in conjunction with the accompanying drawings.

DESCRIPTION OF THE EMBODIMENTS

In this embodiment, in an in-vehicle device as one example of an electronic equipment, an embodiment in which the invention is applied to a structure for assembling a resin panel to a body will be described below with reference to the drawings. However, the embodiment described below is merely an example for implementing the invention and the invention is not limited to the embodiment described below. For example, the invention may be also applied to an assembly structure of the electronic equipment such as a portable terminal such as a smartphone, a tablet, or the like. Furthermore, an assembly structure according to this embodiment is applied to a structure for assembling two parts and an object to which the invention is applied is not limited to the electronic equipment. Moreover, a material of a part to be assembled is not particularly limited and does not need to be resin. In this specification, a "snap-fit engagement" means fitting and fixing the resin panel to the body using elastic (flexible) properties of the material

[Overall Configuration]

Figure 1:
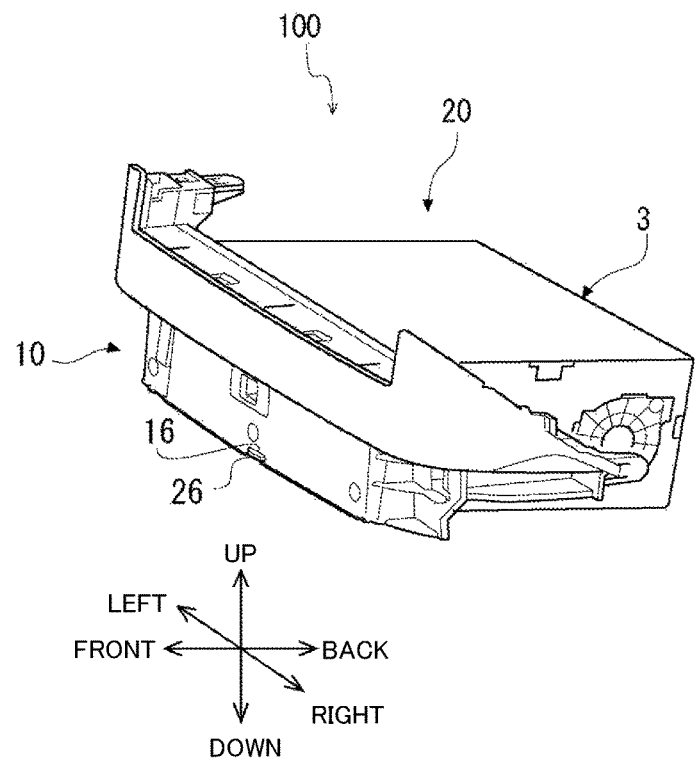
FIG. 1 is a whole perspective view of an assembly according to an embodiment.
Figure 2:
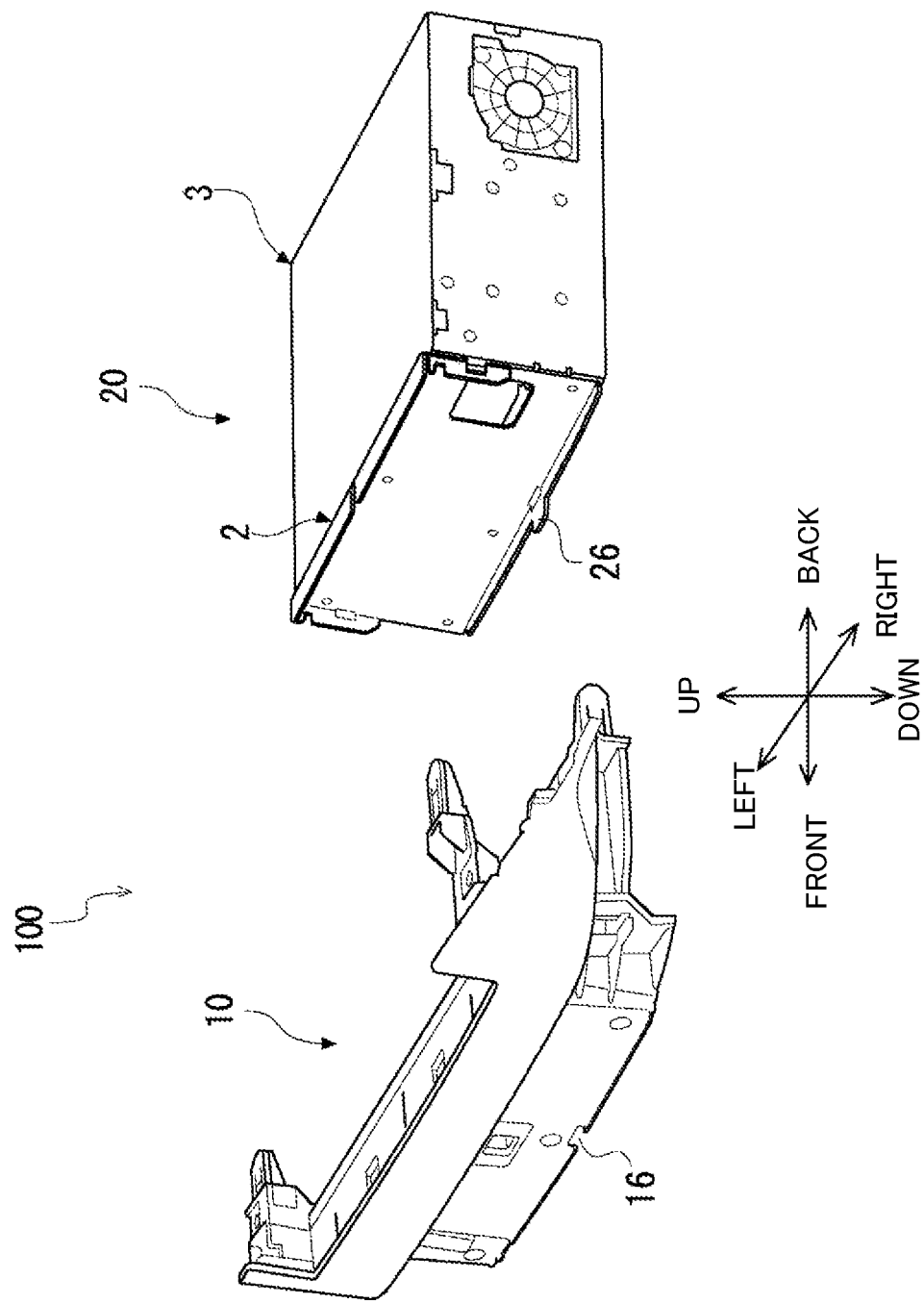
FIG. 2 is an exploded view of the assembly according to the embodiment.

FIG. 1 is a whole perspective view of an assembly 100 according to this embodiment. FIG. 2 is an exploded view of the assembly 100. The assembly 100 is a part of the in-vehicle device. The in-vehicle device is mounted on a vehicle and provides general car navigation and audio functions. The in-vehicle device is an in-dash type device and is buried in an instrument panel or a dash board of the vehicle (not shown). The in-vehicle device is assembled by assembling a display (not shown) that displays various visual information and an operation portion (not shown) that receives an input operation by a user to the assembly 100. The display is, for example, a liquid crystal panel. The operation portion is, for example, an operation button or a touch panel. In this specification, unless there is a special reference, a "front-back direction", a "up-down direction", and a "left-right direction" are referred to as a "front-back direction", a "up-down direction", and a "left-right direction" of the assembly 100.

As illustrated in FIG. 1 and FIG. 2, the assembly 100 includes a resin panel 10 and a body 20 having a box shape. The resin panel 10 is a part in which the display and the operation portion described above are assembled. The resin panel 10 is made of resin and is injection molded by using a mold. The body 20 is a part for executing a process for demonstrating a function of the in-vehicle device. The body 20 supplies the various visual information to the display assembled in the resin panel 10. Operation information received by the operation portion assembled in the resin panel 10 is output to the body 20. By assembling the resin panel 10 to a front face of the body 20, the assembly 100 is assembled. The resin panel 10 is one example of a "first part" according to the invention and the body 20 is one example of a "second part" according to the invention. However, the "first part" and the "second part" according to the invention are not limited to this embodiment.

Figure 3:
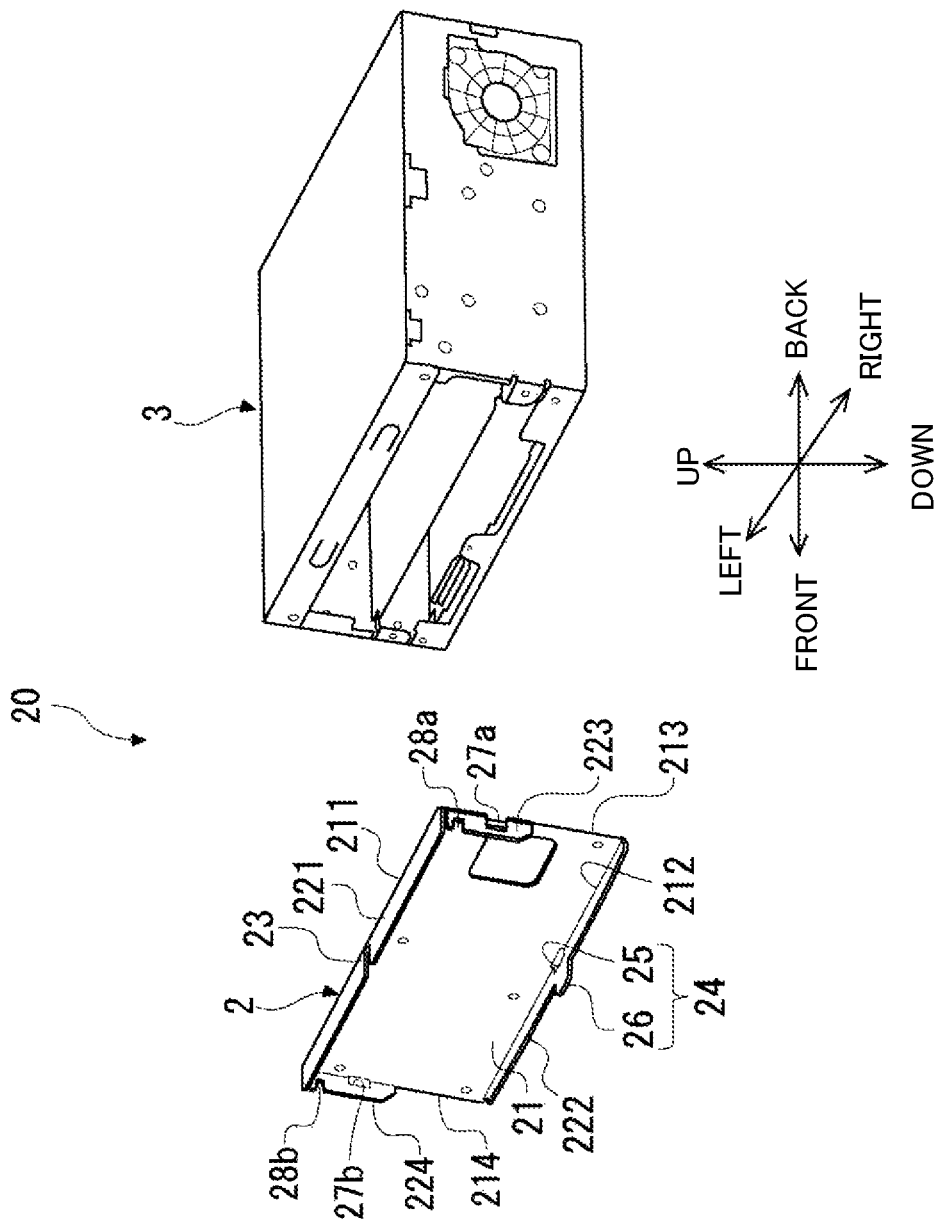
FIG. 3 is an exploded view of a body.

FIG. 3 is an exploded view of the body 20. As illustrated in FIG. 2 and FIG. 3, the body 20 includes a metal assembly panel 2 and a housing 3. The housing 3 is a case having substantially a rectangular parallelepiped shape with an opened front face. The housing 3 includes various hardware (now shown) such a CPU (Central Processing Unit), a memory, a communication interface, and an input-output interface. The assembly panel 2 is provided in the front face of the body 20. More specifically, the assembly panel 2 is assembled to a front face of the housing 3 so as to constitute the front face of the body 20. In assembling of the assembly 100, the resin panel 10 is assembled to the assembly panel 2 assembled to the housing 3. The assembly panel 2 corresponds to one example of a "second assembly" according to the invention.

Figure 4:
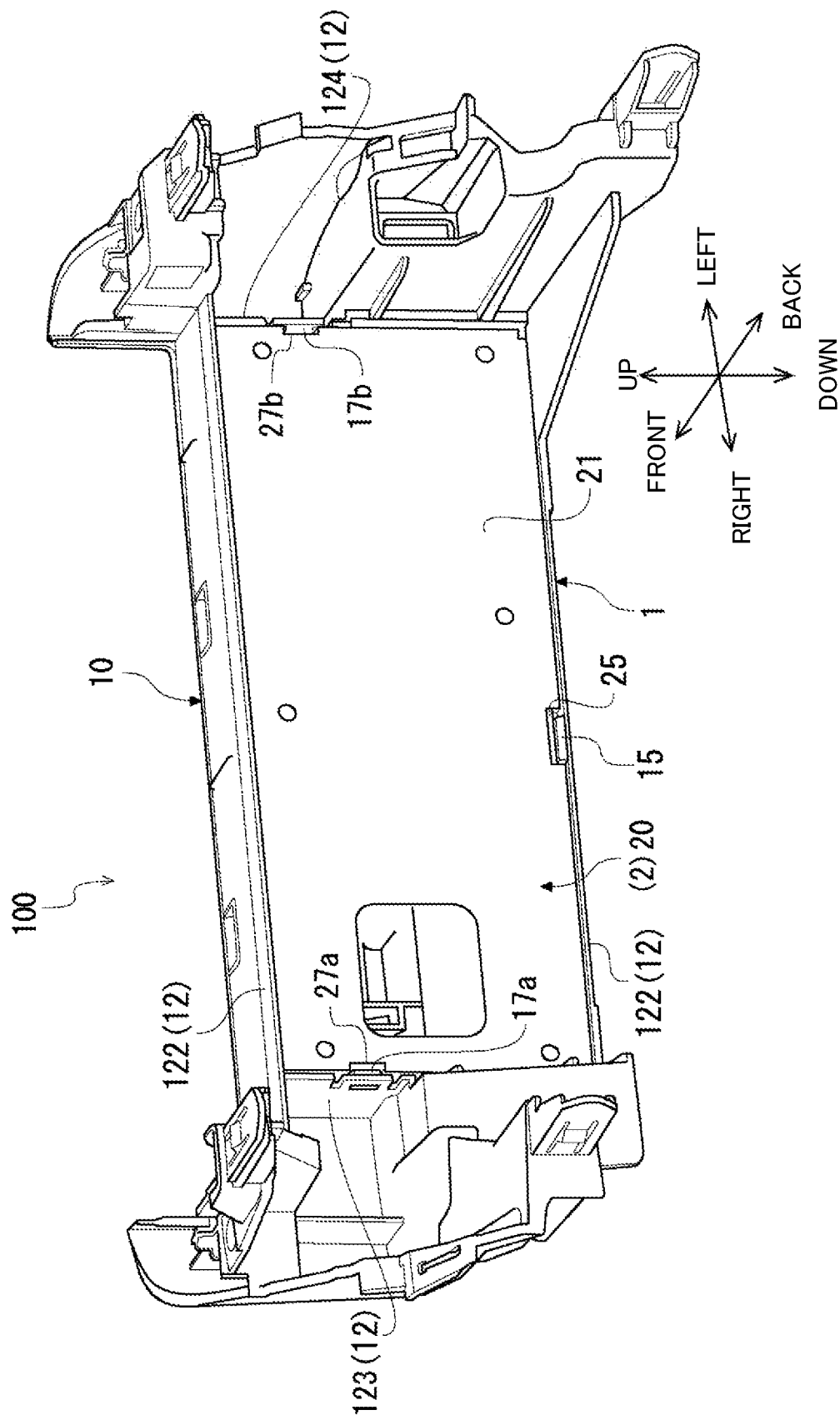
FIG. 4 is a perspective view illustrating a state in which a resin panel is assembled to an assembly panel.

FIG. 4 is a perspective view illustrating a state in which the resin panel 10 is assembled to the assembly panel 2. In FIG. 4, an illustration of the housing 3 is omitted. As illustrated in FIG. 4, the resin panel 10 is provided with an assembly portion 1 as a structure for being assembled to the assembly panel 2. The assembly portion 1 is one example of a "first assembly portion" according to the invention. A configuration including the assembly portion 1 and the assembly panel 2 corresponds to one example of the "assembly structure" according to the invention. Hereinafter, the configuration including the assembly portion 1 and the assembly panel 2 will be described.

[Assembly Portion 1]

Figure 5:
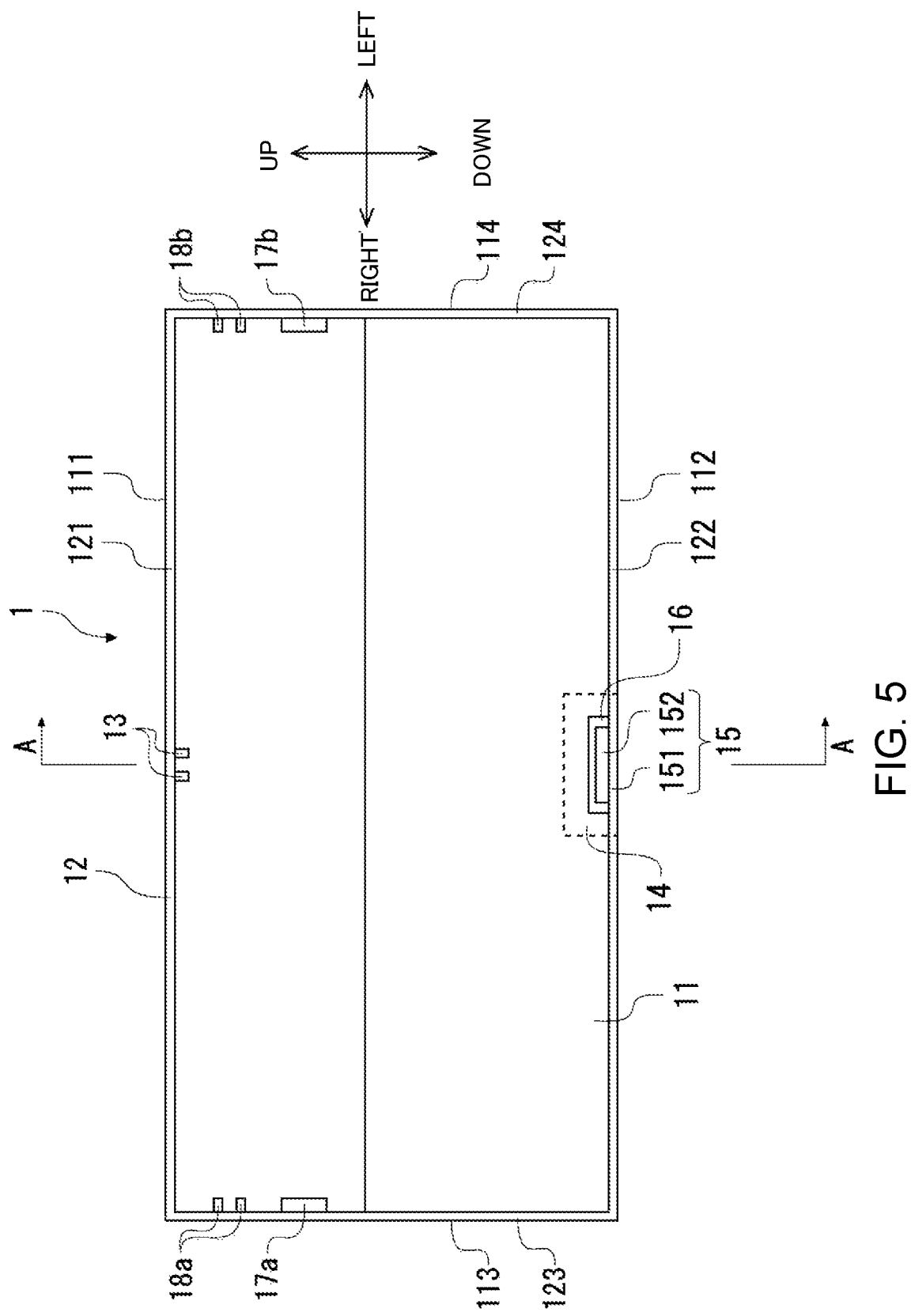
FIG. 5 is a back view schematically illustrating an assembly portion.
Figure 6:
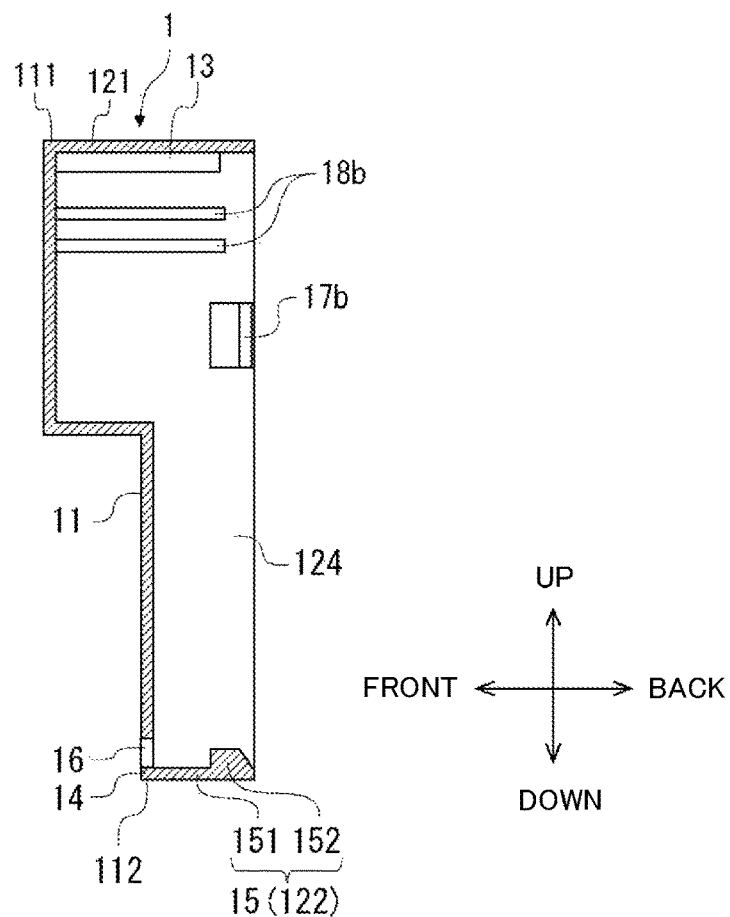
FIG. 6 is a sectional view taken along the line A-A of FIG. 5.

FIG. 5 is a back view schematically illustrating the assembly portion 1. In FIG. 5, the assembly portion 1 is simplified and illustrated. FIG. 6 is a sectional view taken along the line A-A of FIG. 5. As illustrated in FIG. 5, the assembly portion 1 includes a first panel 11 having a rectangular shape in a front (back) view and a peripheral wall 12 protrudes from a peripheral edge of the first panel 11. The peripheral edge of the first panel 11 includes an upper side 111, a lower side 112, and a pair of right and left sides 113, 114. The pair of the right and left sides 113, 114 are orthogonal to the upper and lower sides 111, 112. The peripheral wall 12 includes a first upper wall 121, a first lower wall 122, and a pair of first right and left side walls 123, 124. The first upper wall 121 protrudes from the upper side 111 and the first lower wall 122 protrudes from the lower side 112. The pair of the first right and left side walls 123, 124 protrude from the pair of the right and left sides 113, 114, respectively. The first lower wall 122 is one example of a "first engagement wall" according to the invention, and the pair of the first right and left side walls 123, 124 are one example of a "first orthogonal engagement wall" according to the invention.

As illustrated in FIG. 5 and FIG. 6, the first upper wall 121 is provided with an upper wall rib 13 extending along a protruding direction of the first upper wall 121. The upper wall rib 13 gives a strength to the first upper wall 121 and is also used for positioning between the resin panel 10 and the body 20 as described later.

Figure 7:
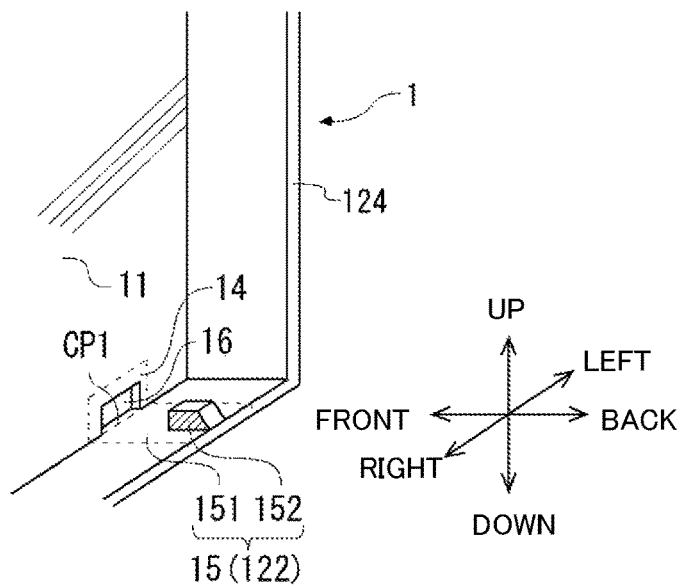
FIG. 7 is a perspective view near an engagement portion.

As illustrated in FIG. 5 and FIG. 6, the assembly portion 1 is provided with a base 14, an engagement portion 15, and a positioning hole 16. FIG. 7 is a perspective view near the engagement portion 15. As illustrated in FIG. 7, the base 14 is formed as a part of the first panel 11. The engagement portion 15 is a snap-fit engagement portion that is formed as a part of the first lower wall 122. Furthermore, the engagement portion 15 includes an extended portion 151 and an engagement projection 152. The extended portion 151 protrudes from the base 14. The engagement projection 152 projects from the extended portion 151 in a direction orthogonal to an extending direction of the extended portion 151. In this embodiment, the engagement projection 152 projects upward.

Figure 8:
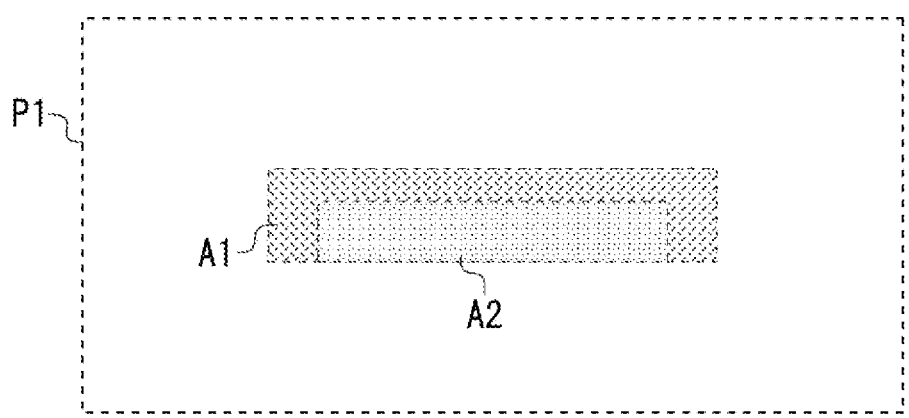
FIG. 8 is a diagram illustrating a positional relation between a positioning hole and an engagement projection.

A symbol CP1 in FIG. 7 shows a connection portion at which the engagement portion 15 is connected to the base 14. As illustrated in FIG. 7, the positioning hole 16 is formed in a circumference of the connection portion CP1 at which the engagement portion 15 is connected to the base 14. That is, the positioning hole 16 is formed in a root of the engagement portion 15 in the base 14. Here, FIG. 8 is a diagram illustrating a positional relation between the positioning hole 16 and the engagement projection 152. FIG. 8 illustrates a state viewed along the extending direction of the extended portion 151. A symbol P1 in FIG. 8 shows a virtual plane orthogonal to the extending direction (front-back direction in this embodiment) of the extended portion 151. A symbol A1 shows an area in which the positioning hole 16 is projected to the plane P1. A symbol A2 shows an area in which the engagement projection 152 is projected to the plane P1. As illustrated in FIG. 8, all of a projected area A2 of the engagement projection 152 is included in the projected area A1 of the positioning hole 16.

Figure 9:
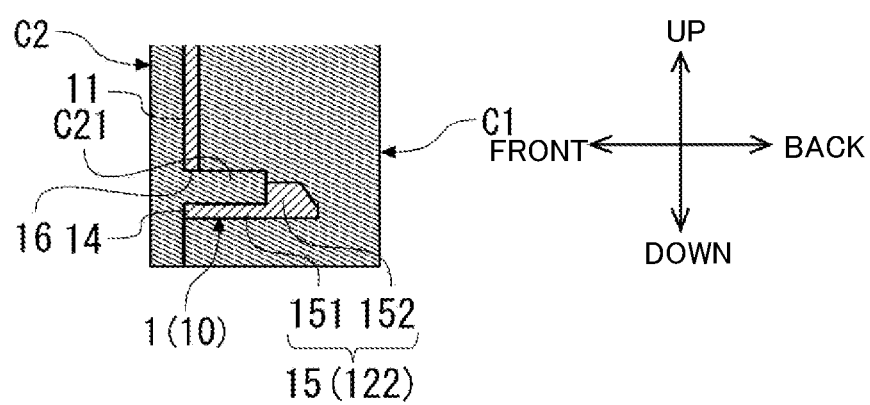
FIG. 9 is a sectional view schematically illustrating a mold when molding the resin panel by injection molding.

FIG. 9 is a sectional view schematically illustrating a mold when molding the resin panel 10 by injection molding. In FIG. 9, a symbol C1 shows a cavity and a symbol C2 shows a core. The resin panel 10 according to this embodiment is injection molded by the mold of front-back two-way removal. At this time, as illustrated in FIG. 9, in order to form the engagement portion 15, it is necessary to mold the engagement projection 152 projecting in a direction orthogonal to a mold removing direction. That is, the engagement portion 15 has an undercut shape. Thus, as illustrated in FIG. 9, the engagement portion 15 is molded by a cut-off structure in which a part of the core C2 is projected to a side of the cavity C1. The engagement projection 152 is formed by a projection C21 of the core C2 projecting to the side of the cavity C1. At this time, in the base 14, the positioning hole 16 is formed as a through hole through which the projection C21 passes when the resin panel 10 is released from the mold. Thus, as described above, all of the projected area A2 of the engagement projection 152 is included in the projected area A1 of the positioning hole 16. As a result, the positioning hole 16 is formed in a position opposite to the engagement projection 152 of a root of the extended portion 151 in the base 14. Furthermore. the positioning hole 16 is a through hole for molding the engagement portion 15. As illustrated in FIG. 2, the positioning hole 16 penetrates the resin panel 10 and is formed in a front face of the resin panel 10. The positioning hole 16 is one example of the "hole" according to the invention.

As illustrated in FIG. 5 and FIG. 6, the first right side wall 123 is provided with a snap-fit side wall engagement portion 17a and a side wall rib 18a extending along a protruding direction of the first right side wall 123. The side wall engagement portion 17a is formed as a part of the first right side wall 123. The side wall rib 18a gives a strength to the first right side wall 123 and is also used for positioning between the resin panel 10 and the body 20 as described later. Similarly, the first left side wall 124 is provided with a snap-fit side wall engagement portion 17b and a side wall rib 18b extending along a protruding direction of the first left side wall 124. The side wall engagement portion 17b is formed as a part of the first left side wall 124. The side wall rib 18b gives a strength to the first left side wall 124 and is also used for positioning between the resin panel 10 and the body 20 as described later. Each of the side wall ribs 18a, 18b is one example of the "rib" according to the invention.

[Assembly Panel 2]

Figure 10:
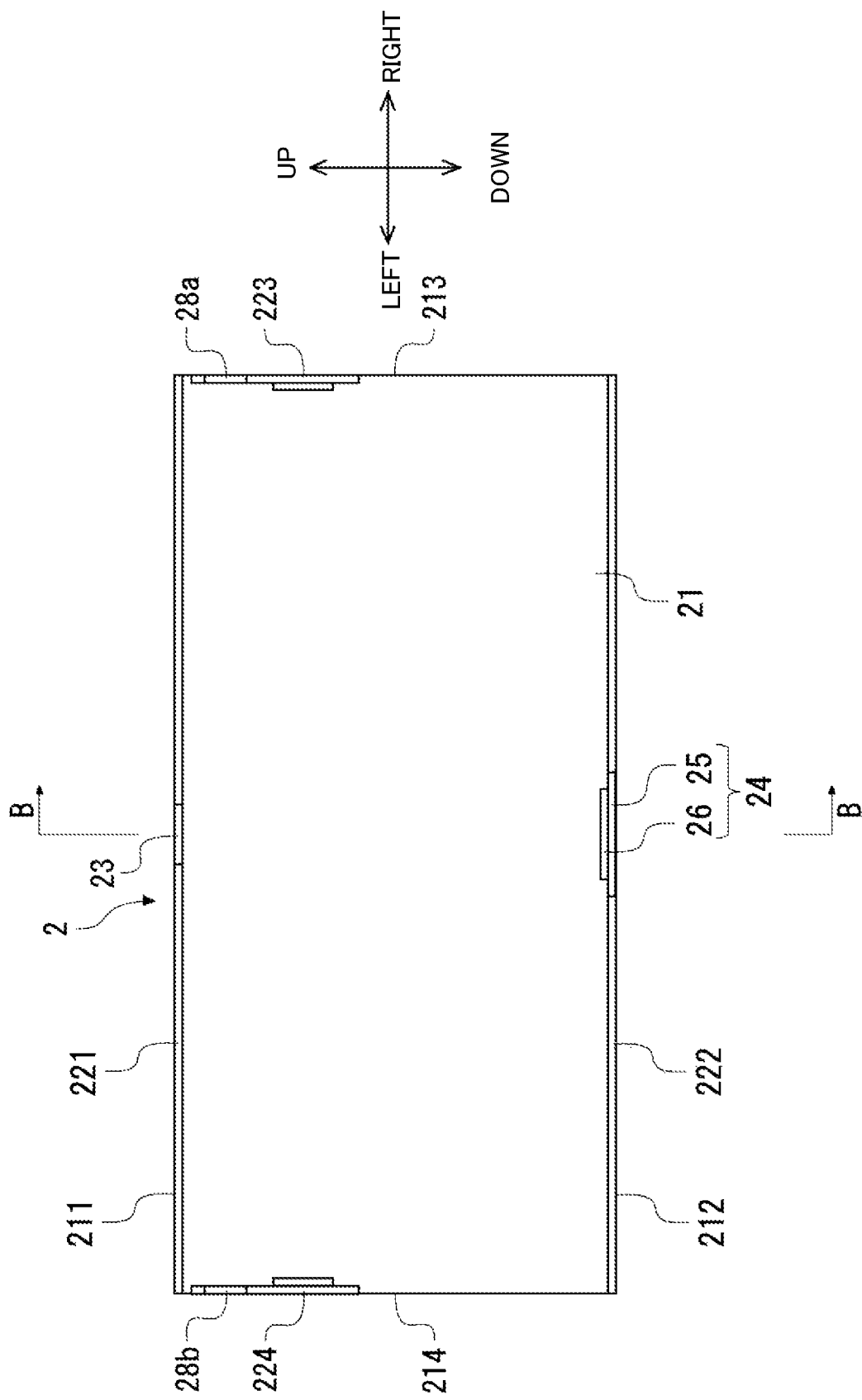
FIG. 10 is a front view schematically illustrating the assembly panel.
Figure 11:
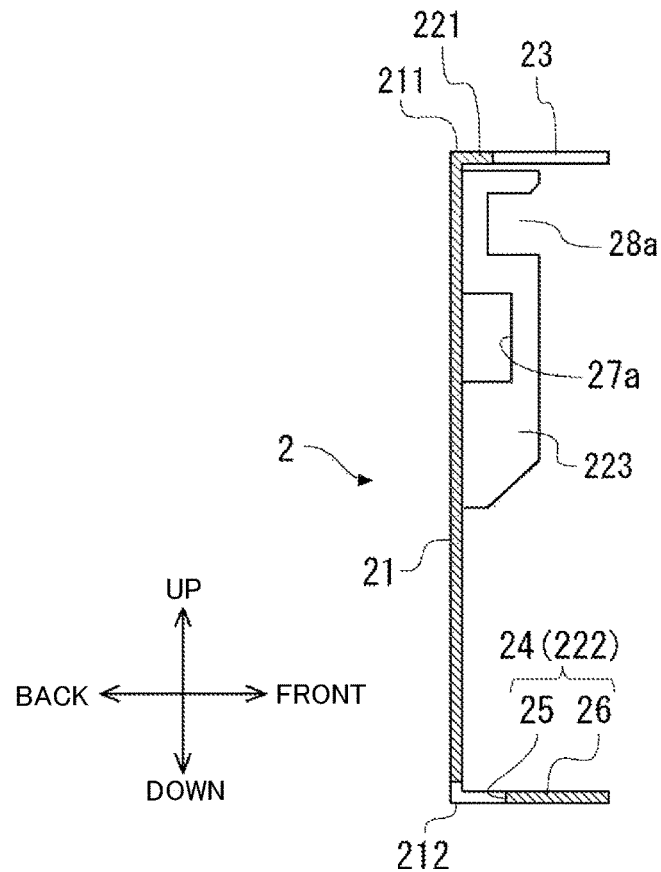
FIG. 11 is a sectional view taken along the line B-B of FIG. 10.

FIG. 10 is a front view schematically illustrating the assembly panel 2. In FIG. 10, the assembly panel 2 is simplified and illustrated. FIG. 11 is a sectional view taken along the line B-B of FIG. 10. As illustrated in FIG. 10, the assembly panel 2 includes a second panel 21 having a rectangular shape in a front view. A peripheral edge of the second panel 21 includes an upper side 211, a lower side 212, and a pair of right and left sides 213, 214. The pair of the right and left sides 213, 214 are orthogonal to the upper and lower sides 211, 212. Furthermore, the assembly panel 2 includes a second upper wall 221, a second lower wall 222, and a pair of second right and left side walls 223, 224. The second upper wall 221 protrudes from the upper side 211 and the second lower wall 222 protrudes from the lower side 212. The pair of the second right and left side walls 223, 224 protrude from the pair of the right and left sides 213, 214, respectively. The second lower wall 222 is one example of a "second engagement wall" according to the invention, and the pair of the second right and left side walls 223, 224 are one example of a "second orthogonal engagement wall" according to the invention.

As illustrated in FIG. 10 and FIG. 11, the second upper wall 221 is provided with an upper wall positioning groove 23 extending along a protruding direction of the second upper wall 221. The upper wall positioning groove 23 is capable of receiving the upper wall rib 13 of the assembly portion 1.

Figure 12:
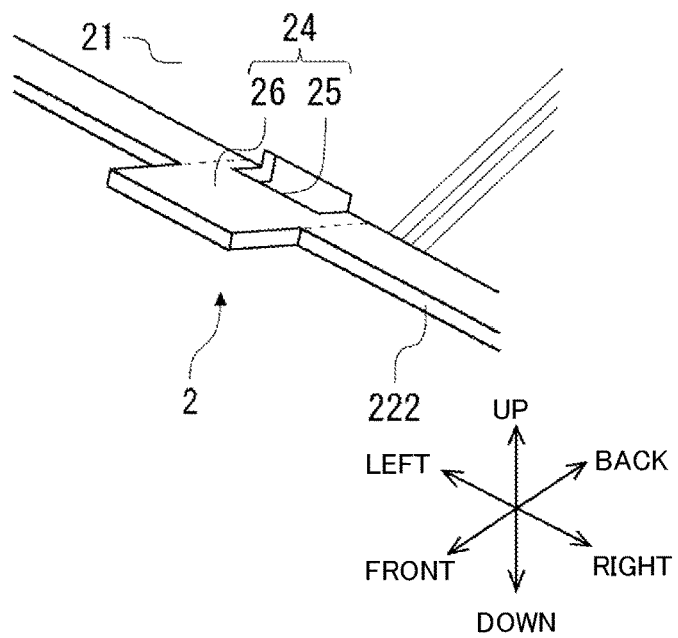
FIG. 12 is a perspective view near an insertion portion.

As illustrated in FIG. 10 and FIG. 11, the second lower wall 222 of the assembly panel 2 is provided with an insertion portion 24. FIG. 12 is a perspective view near the insertion portion 24. As illustrated in FIG. 12, the insertion portion 24 is formed as a part of the second lower wall 222 and extends forward from the second panel 21. The insertion portion 24 includes a locking portion 25 and a positioning projection 26. The locking portion 25 is formed as an inner wall of a hole provided at a base end of the insertion portion 24 and is engaged with the engagement projection 152 of the engagement portion 15 of the assembly portion 1 to lock the assembly portion 1 and the assembly panel 2 together. The positioning projection 26 is formed as a distal end (front end) of the insertion portion 24 and is inserted into the positional hole 16 of the assembly portion 1. The positional projection 26 is one example of the "projection" according to the invention.

As illustrated in FIG. 10 and FIG. 11, the second right side wall 223 is provided with a side wall locking portion 27a and a side wall groove 28a. The side wall locking portion 27a is formed as an inner wall of a hole provided in the second right side wall 223 and is engaged with the side wall engagement portion 17a of the assembly portion 1 to lock the assembly portion 1 and the assembly panel 2 together. The side wall groove 28a extends along a protruding direction of the second right side wall 223 and is capable of receiving the side wall rib 18a of the assembly portion 1. Similarly. the second left side wall 224 is provided with a side wall locking portion 27b and a side wall groove 28b. The side wall locking portion 27b is formed as an inner wall of a hole provided in the second left side wall 224 and is engaged with the side wall engagement portion 17b of the assembly portion 1 to lock the assembly portion 1 and the assembly panel 2 together. The side wall groove 28b extends along a protruding direction of the second left side wall 224 and is capable of receiving the side wall rib 18b of the assembly portion 1. Each of the side wall grooves 28a, 28b is one example of the "groove" according to the invention.

[Assembly Method]

Figure 13:
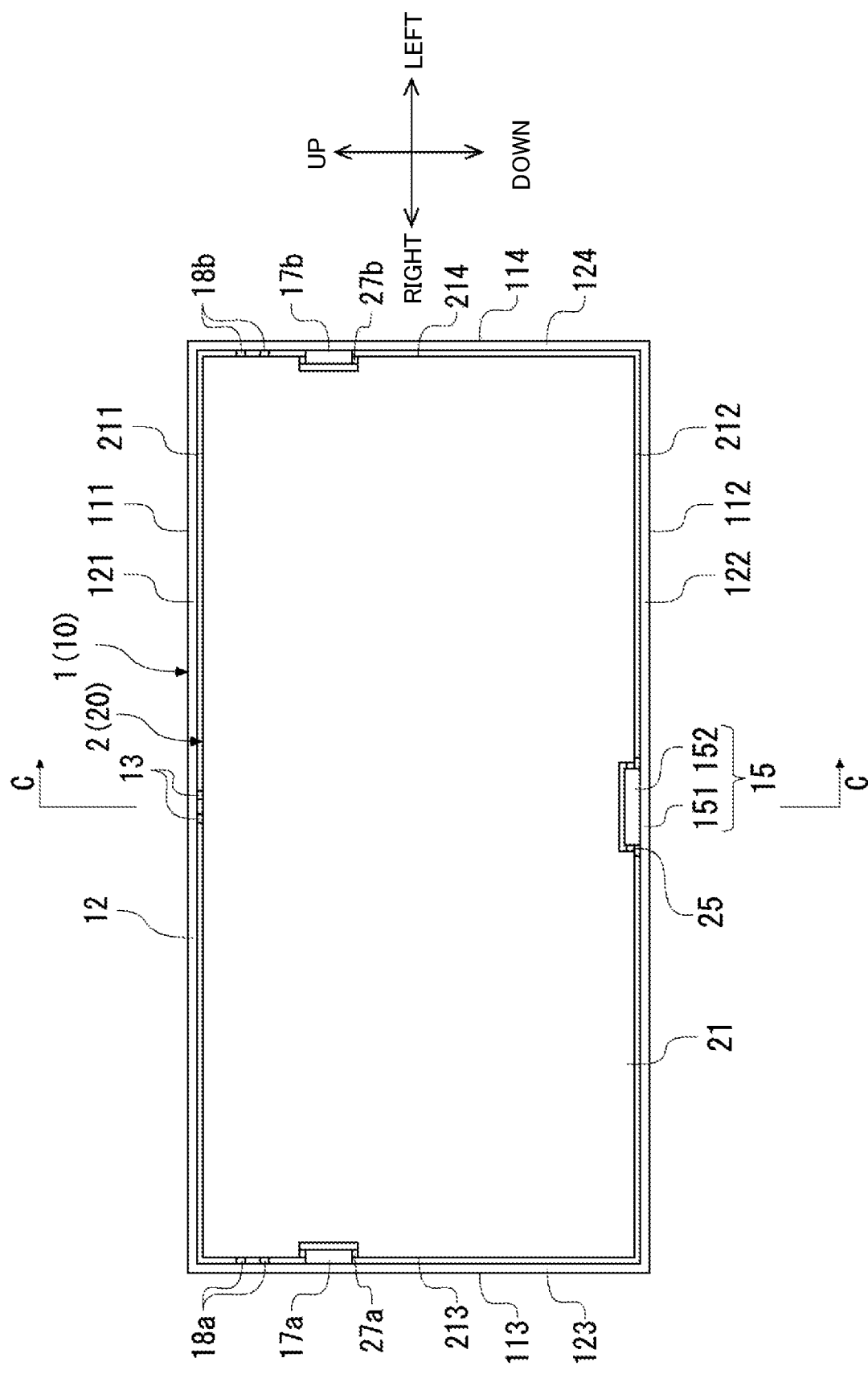
FIG. 13 is a back view schematically illustrating a state of the assembly portion and the assembly panel in the assembly.
Figure 14:
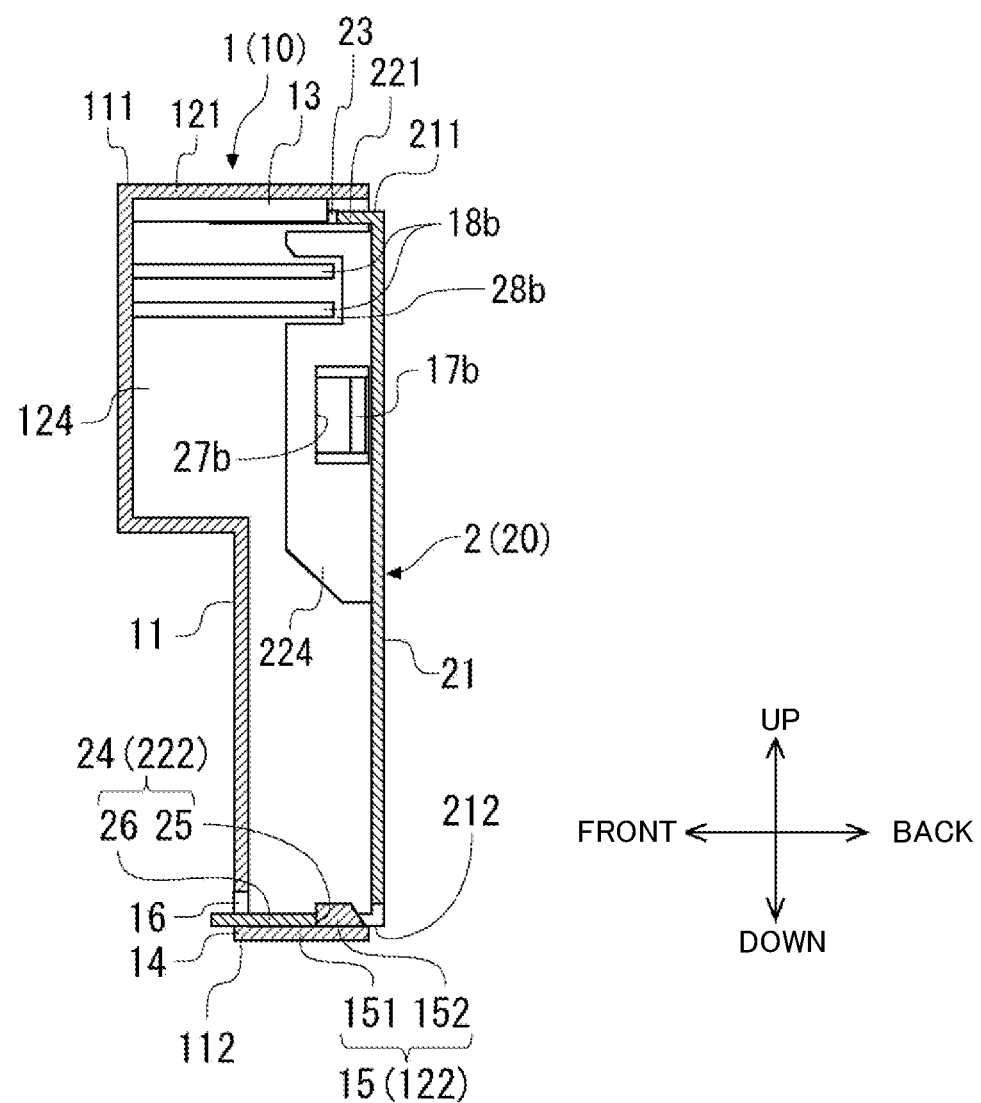
FIG. 14 is a sectional view taken along the line C-C of FIG. 13.

FIG. 13 is a back view schematically illustrating a state of the assembly portion 1 and the assembly panel 2 in the assembly 100. In FIG. 13, the assembly portion 1 and the assembly panel 2 are simplified and illustrated. FIG. 14 is a sectional view taken along the line C-C of FIG. 13. Hereinafter, an assembly method of the resin panel 10 to the body 20 will be described.

As illustrated in FIG. 13 and FIG. 14, by connecting the assembly portion 1 to the assembly panel 2, the resin panel 10 is assembled to the body 20. Specifically, the positioning projection 26 of the assembly panel 2 is inserted into the positioning hole 16 of the assembly portion 1 and the upper wall rib 13 of the assembly portion 1 is received by the upper wall positioning groove 23 of the assembly panel 2 so that the side wall ribs 18a, 18b of the assembly portion 1 are received by the side wall grooves 28a, 28b of the assembly panel 2. The engagement portion 15 of the assembly portion 1 is engaged with the locking portion 25 of the assembly panel 2 so as to engage the side wall engagement portions 17a, 17b of the assembly portion 1 with the side wall locking portions 27a, 27b of the assembly panel 2. The positioning projection 26 of the assembly panel 2 is inserted into the positioning hole 16 of the assembly portion 1 and the upper wall rib 13 of the assembly portion 1 is received by the upper wall positioning groove 23 of the assembly panel 2 so that a lateral move of the resin panel 10 to the body 20 is regulated. As a result, the resin panel 10 and the body 20 are positioned in a lateral direction. Furthermore, the side wall ribs 18a, 18b of the assembly portion 1 are received by the side wall grooves 28a, 28b of the assembly panel 2 so that a vertical move of the resin panel 10 to the body 20 is regulated. As a result, the resin panel 10 and the body 20 are positioned in a vertical direction. The engagement portion 15 of the assembly portion 1 is engaged with the locking portion 25 of the assembly panel 2 and the side wall engagement portions 17a, 17b of the assembly portion 1 are engaged with the side wall locking portions 27a, 27b of the assembly panel 2 so that the resin panel 10 is fixed to the body 20. This is referred to as a "temporary fixing state. The resin panel 10 is further fixed to the body 20 using a fastening member, such as screw.

Figure 15:
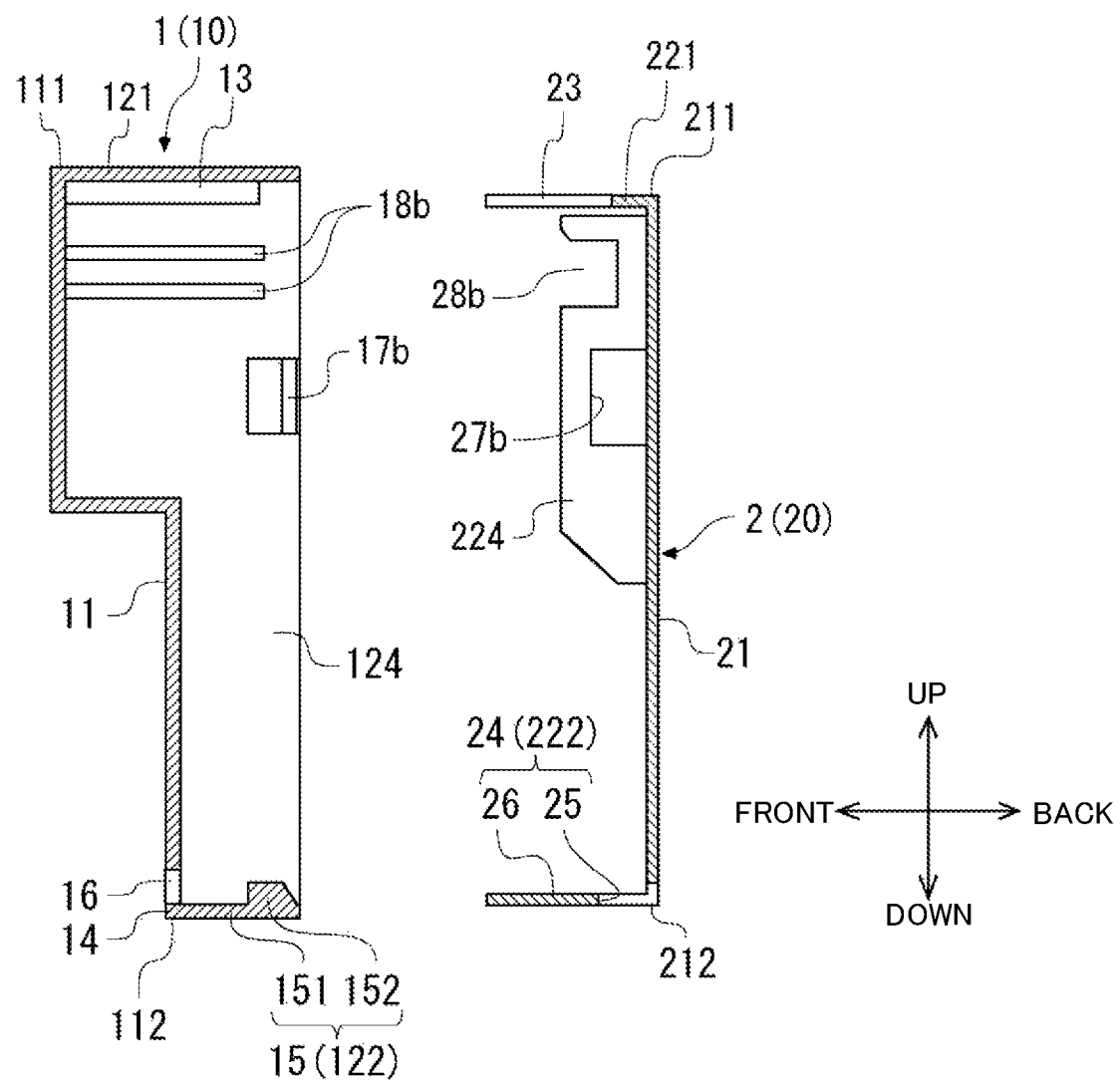
FIG. 15 is a first sectional view illustrating a process of assembling the resin panel to the body.
Figure 16:
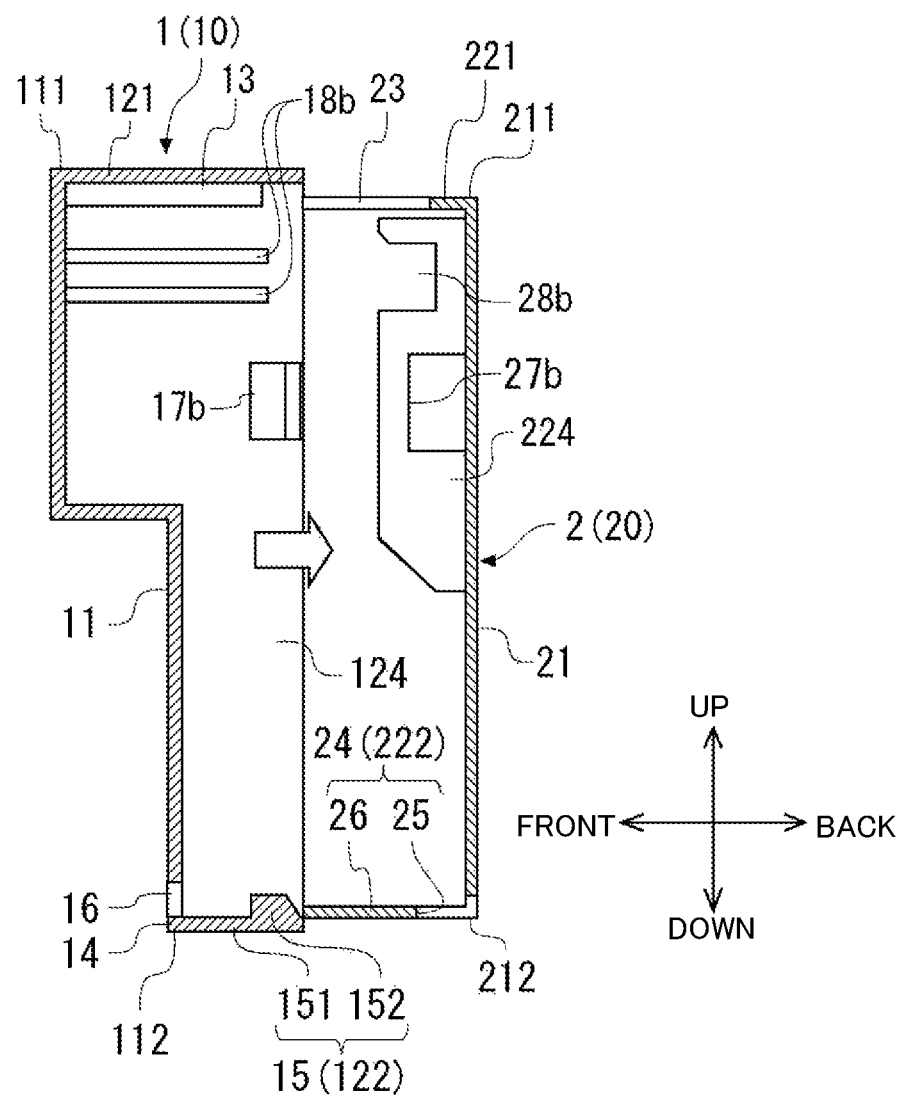
FIG. 16 is a second sectional view illustrating a process of assembling the resin panel to the body.
Figure 17:
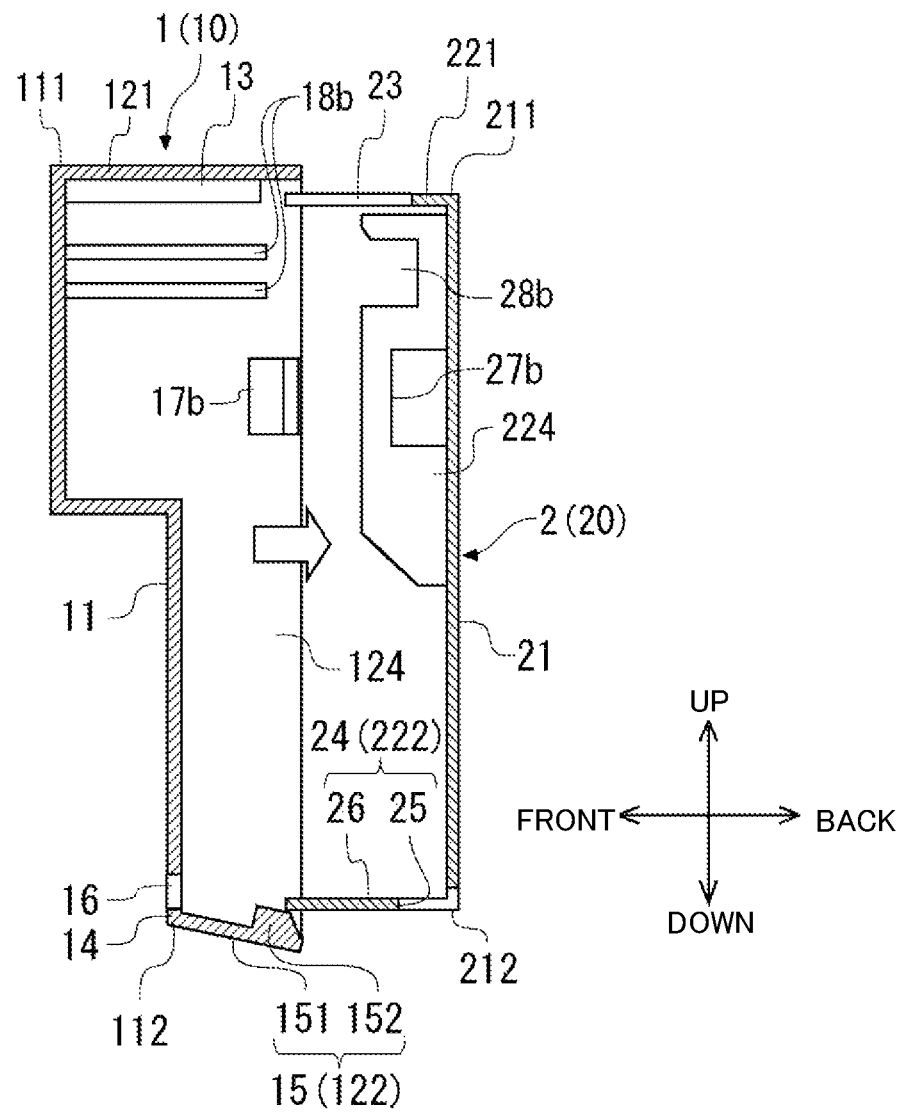
FIG. 17 is a third sectional view illustrating a process of assembling the resin panel to the body.

Here, each of FIG. 15 to FIG. 17 illustrates a sectional view illustrating a process of assembling the resin panel 10 to the body 20. In order to connect the assembly portion 1 to the assembly panel 2, first, as illustrated in FIG. 15, the resin panel 10 is arranged in front of the body 20. Next, the resin panel 10 is moved to a side of the body 20 (backward)

from a state illustrated in FIG. 15. At this time, the resin panel 10 is moved in a state in which the resin panel 10 is aligned to the body 20 so that the positioning projection 26 of the assembly panel 2 is inserted into the positioning hole 16 of the assembly portion 1. As described above, the positioning hole 16 is formed in a position opposite to the engagement projection 152 in the base 14. Thus, as illustrated in FIG. 16, before the positioning projection 26 is inserted into the positioning hole 16, the engagement projection 152 has been abutted to the positioning projection 26. In this state, when the resin panel 10 is further moved to the side of the body 20 against an elastic force of the engagement portion 15, as illustrated in FIG. 17, the positioning projection 26 moves over the engagement projection 152. In this state, when the resin panel 10 is further moved to the side of the body 20, as illustrated in FIG. 14, the positioning projection 26 is inserted into the positioning hole 16.

As illustrated in FIG. 15 to FIG. 17, the insertion portion 24 that is provided with the positioning projection 26 and the locking portion 25 extends along an insertion direction (front direction in this embodiment) of the positioning projection 26 into the positioning hole 16. In the insertion direction, the locking portion 25 is positioned before the positioning projection 26. Thus, when the insertion portion 24 is moved along the insertion direction, the positioning projection 26 moves over the engagement projection 152 and is inserted into the positioning hole 16 so that the engagement projection 152 is engaged with the locking portion 25.

As illustrated in FIG. 1, in the assembly 100 in which the resin panel 10 is assembled to the body 20, in the front face of the resin panel 10, the positioning projection 26 projects from the positioning hole 16. As described above, the positioning hole 16 is a through hole penetrating the resin panel 10 in a front-back direction. Thus, when a worker assembles the resin panel 10 to the body 20, the worker recognizes the positioning projection 26 of the assembly panel 2 through the positioning hole 16 from a front face side of the resin panel 10 and performs alignment between the positioning hole 16 and the positioning projection 26.

[Effect]

As described above, the assembly structure according to this embodiment includes the assembly portion 1 of the resin panel 10 and the assembly panel 2 of the body 20. The assembly portion 1 includes the base 14, the engagement portion 15 that is elastically-deformable and protrudes from the base 14, and the positioning hole 16 formed in the circumference of the connection portion CP1 at which the engagement portion 15 is connected to the base 14. Furthermore, the assembly panel 2 includes the locking portion 25 that is engaged with the engagement portion 15 to lock the assembly portion 1 and the assembly panel 2 together, and the positioning projection 26 that is inserted into the positioning hole 16. In a state in which the positioning projection 26 is inserted into the positioning hole 16, the engagement portion 15 is engaged with the locking portion 25.

In the assembly structure according to this embodiment, the positioning hole 16 that is used for positioning between the resin panel 10 and the body 20 is formed in the root (circumference of the connection portion CP1) of the engagement portion 15 for fixing the resin panel 10 and the body 20. That is, the positioning portion and the engagement portion are provided in a same place. As a result, according to the assembly structure according to this embodiment, it is possible to reduce a space required for providing the positioning portion and the engagement portion compared to a case in which the positioning portion and the engagement portion are provided in different places. That is, space saving is attained, which contributes to product miniaturization.

Furthermore, the engagement portion 15 according to this embodiment includes the extended portion 151 that protrudes from the base 14, and the engagement projection 152 that projects from the extended portion 151 in the direction orthogonal to the extending direction of the extended portion 151 and that is engaged with the locking portion 25. When the engagement projection 152 and the positioning hole 16 are projected to the plane P1 that is orthogonal to the extending direction of the extended portion 151, all of the projected area A2 of the engagement projection 152 is included in the projected area A1 of the positioning hole 16. The locking portion 25 and the positioning projection 26 are provided in the insertion portion 24 of the assembly panel 2. The insertion portion 24 extends along the insertion direction of the positioning projection 26 into the positioning hole 16. In the insertion direction, the locking portion 25 is positioned before the positioning projection 26. When the insertion portion 24 is moved along the insertion direction to insert the positioning projection 26 into the positioning hole 16, the engagement projection 152 is engaged with the locking portion 25. Thus, the engagement projection 152 is engaged with the locking portion 25 by one operation of inserting the positioning projection 26 into the positioning hole 16. As a result, it is possible to improve workability in assembling.

Furthermore, in this embodiment, the resin panel 10 is made of resin, and the positioning hole 16 is a through hole that is formed in the base 14 and that is used to mold the engagement portion 15 from the resin using the mold. By using the through hole in molding as the positioning portion, it is possible to reduce a space required for providing the positioning portion and the engagement portion compared to a case in which the positioning portion is provided separately from the engagement portion. In this embodiment, all of the resin panel 10 is made of resin, but all of the first part according to the invention does not need to be made of resin. Only the first assembly portion provided in the first part may be made of resin. The positioning hole according to the invention does not need to be a through hole.

Furthermore, the assembly portion 1 according to this embodiment includes the first panel 11 having a rectangular shape in a front view, the first lower wall 122 that protrudes from the lower side 112 of the first panel 1, and the pair of the first right and left side walls 123, 124 that protrude from the pair of the right and left sides 113, 114 that is orthogonal to the lower side 112. The assembly panel 2 includes the second panel 21 having a rectangular shape in a front view, the second lower wall 222 that protrudes from the lower side 212 of the second panel 21, and the pair of the second right and left side walls 223, 224 that protrude from the pair of the right and left sides 213, 214 that are orthogonal to the lower side 212. The base 14 is formed as a part of the first panel 11. The engagement portion 15 is formed as a part of the first lower wall 122. The locking portion 25 and the positioning projection 26 are formed as a part of the second lower wall 222. The pair of the first right and left side walls 123, 124 are respectively provided with the side wall ribs 18a, 18b that extend along the protruding direction of the pair of the first right and left side walls 123, 124. The pair of the second right and left side walls 223, 224 are respectively provided with the side wall grooves 28a, 28b that receive the side wall ribs 18a, 18b. Thus, the side wall ribs 18a, 18b and the side wall grooves 28a, 28b are used for positioning. By providing the positioning portions in the lower side 112 as one side of the first panel 11 and the pair of the right and left sides 113, 114 that are orthogonal to the lower side 112, it is possible to accurately assemble the resin panel 10 to the body 20. Furthermore, since the side wall engagement portions 17a, 17b as the engagement portions are provided side by side with the side wall ribs 18a, 18b as the positioning portions, it is possible to realize space saving. In this embodiment, although the lower side 112 of the first panel 11 and the pair of the right and left sides 113, 114 are provided with the engagement portions and the positioning portions, the invention is not limited thereto. That is, in the panel, the side in which the engagement portions and the positional portions are provided is not particularly limited.

Furthermore, the positioning hole 16 according to this embodiment is formed as a through hole that penetrates the resin panel 10. When the worker assembles the resin panel 10 to the body 20, the worker recognizes the positioning projection 26 of the assembly panel 2 through the positioning hole 16 from the front face side of the resin panel 10 (i.e., from the opposite side of the body 20 across the resin panel 10) and performs alignment between the positioning hole 16 and the positioning projection 26. Thus, the worker can confirm whether or not the positioning is correctly performed. Therefore, it becomes easy to assemble the resin panel 10 to the body 20. As a result, it is possible to improve workability in assembling. The positioning hole according to the invention does not need to be a through hole.

<Others>

As described above, although the invention has been described with reference to the embodiment, the invention is not limited to the above described embodiment.

While the invention has been shown and described in detail, the foregoing description is in all aspects illustrative and not restrictive. It is therefore understood that numerous other modifications and variations can be devised without departing from the scope of the invention.

What is claimed is:

1. An assembly structure for assembling a first part to a second part, the assembly structure comprising:
    a first assembly portion configured to be provided in the first part; and
    a second assembly portion configured to be provided in the second part, wherein
    the first assembly portion includes: (i) a first panel having a rectangular shape in a front view, a portion of the first panel adjacent to a first side of the first panel forming a base, (ii) a first engagement wall that protrudes from the first side of the first panel in a first direction that is orthogonal to a plane of the first panel, a portion of the first engagement wall that is located adjacent to the base so as to protrude from the base forming an engagement portion that is elastically-deformable in a direction orthogonal to the first direction that the first engagement wall protrudes from the first panel, and (iii) a hole that extends through the first panel at the base and that is adjacent to a connection portion at which the engagement portion is connected to the base,
    the second assembly portion includes: (a) a second panel having a rectangular shape in a front view, and (b) a second engagement wall that protrudes from a first side of the second panel in a direction that is orthogonal to a plane of the second panel, a portion of the second engagement wall forming an insertion portion that includes (b1) a locking portion that is configured to be engaged with the engagement portion of the first engagement wall to lock the first and second assembly portions together, and (b2) a projection that protrudes farther from the first side of the second panel than a remainder of the second engagement wall and that is inserted into the hole of the first panel when the first and second assembly portions are locked together,
    the engagement portion of the first engagement wall elastically-deforms in the direction orthogonal to the first direction that the first engagement wall protrudes from the first panel when the engagement portion is contacted by the projection of the second engagement wall as the first and second assembly portions are moved toward each other, and
    in a state in which the projection is inserted into the hole of the first panel, the engagement portion of the first engagement wall is engaged with the locking portion of the second engagement wall at a location that is between the first and second panels so that the locking portion does not extend into or through the hole of the first panel.

2. The assembly structure according to claim 1, wherein the engagement portion of the first engagement wall includes an engagement projection that projects from the first engagement wall in the direction orthogonal to the first direction that the first engagement wall protrudes from the first panel, the engagement projection engaging with the locking portion, and
    when the engagement projection and the hole are projected to a plane that is orthogonal to the first direction that the first engagement wall protrudes from the first panel, all of a projected area of the engagement projection is included in a projected area of the hole.

3. The assembly structure according to claim 1, wherein the first assembly portion is made of resin, and the hole is used to mold the engagement portion from the resin using a mold.

4. The assembly structure according to claim 1, wherein the first assembly portion includes a pair of first orthogonal engagement walls that protrude in a same direction as the first engagement wall from a pair of sides of the first panel that are orthogonal to the first side of the first panel,
    the second assembly portion includes a pair of second orthogonal engagement walls that protrude in a same direction as the second engagement wall from a pair of sides of the second panel that are orthogonal to the first side of the second panel,
    the pair of first orthogonal engagement walls are respectively provided with ribs that extend along a protruding direction of the pair of first orthogonal engagement walls, and
    the pair of second orthogonal engagement walls are respectively provided with grooves that receive the ribs when the first and second assembly portions are assembled to each other.

* * * * *